United States Patent [19]
Kanamaru

[11] Patent Number: 6,012,906
[45] Date of Patent: Jan. 11, 2000

[54] UNIFORM SPEED JOINT AND AXIAL PISTON PUMP USING THE JOINT

[75] Inventor: Hisanobu Kanamaru, Hitachinaka, Japan

[73] Assignee: Hitachi, Ltd., Japan

[21] Appl. No.: 08/782,079

[22] Filed: Jan. 13, 1997

Related U.S. Application Data

[62] Division of application No. 08/396,432, Feb. 28, 1995, Pat. No. 5,634,852.

[30] Foreign Application Priority Data

Feb. 28, 1994 [JP] Japan .................................. 6-29271

[51] Int. Cl.[7] ...................................................... F04B 1/26
[52] U.S. Cl. ................................. 417/269; 92/71; 91/499
[58] Field of Search ............................. 417/269; 91/499; 92/71

[56] References Cited

U.S. PATENT DOCUMENTS

| | | | |
|---|---|---|---|
| 981,736 | 1/1911 | Zock ........................................ | 464/138 |
| 2,784,576 | 3/1957 | Weir ........................................ | 464/138 |
| 3,656,299 | 4/1972 | Fleury ..................................... | 91/499 |
| 3,823,576 | 7/1974 | Colletti et al. ........................ | 464/138 X |
| 4,771,676 | 9/1988 | Matsumoto et al. .................. | 92/71 X |
| 4,894,045 | 1/1990 | Kanamaru et al. .................... | 464/138 |
| 5,035,677 | 7/1991 | Kanamaru et al. .................... | 464/138 |
| 5,056,416 | 10/1991 | Ota et al. ................................ | 92/71 X |
| 5,070,765 | 12/1991 | Parsons .................................. | 92/71 |
| 5,129,797 | 7/1992 | Kanamaru .............................. | 417/500 |
| 5,279,205 | 1/1994 | Carlson, Jr. et al. .................. | 91/499 |
| 5,490,767 | 2/1996 | Kanou et al. .......................... | 92/71 X |

FOREIGN PATENT DOCUMENTS

| | | | |
|---|---|---|---|
| 626377 | 2/1936 | Germany ................................ | 464/138 |
| 49-64755 | 6/1974 | Japan . | |
| 57-190143 | 11/1982 | Japan ..................................... | 464/137 |
| 60-34518 | 2/1985 | Japan . | |
| 4-4473 | 1/1986 | Japan . | |
| 61-226578 | 10/1986 | Japan . | |
| 61-241530 | 10/1986 | Japan ..................................... | 464/137 |
| 61-248920 | 11/1986 | Japan . | |
| 63-13921 | 1/1988 | Japan ..................................... | 464/137 |
| 63-308220 | 12/1988 | Japan . | |
| 2-38716 | 2/1990 | Japan . | |
| 3-125021 | 5/1991 | Japan ..................................... | 464/138 |
| 404191473A | 7/1992 | Japan ..................................... | 417/269 |
| 4-228924 | 8/1992 | Japan . | |
| 4-72072 | 11/1992 | Japan . | |
| 405099137A | 4/1993 | Japan ..................................... | 417/269 |
| 5-263759 | 10/1993 | Japan . | |

OTHER PUBLICATIONS

JP B 16–6384, P.212.

Primary Examiner—Timothy S. Thorpe
Assistant Examiner—Cheryl J. Tyler
Attorney, Agent, or Firm—Evenson, McKeown, Edwards & Lenahan, P.L.L.C.

[57] ABSTRACT

A uniform speed joint has three or more drive pins one side ends of which are concentrically arranged in one side face of either one of a driving member and driven member, and the other ends of the drive pins are rotatably and slidably arranged in one side face of the other member and supported through ball bearings the periphery of which is restricted and supported. An axial piston pump is constructed by application of the uniform speed joint.

3 Claims, 3 Drawing Sheets

UNIFORM SPEED JOINT AND AXIAL PISTON PUMP USING THE JOINT

This is a divisional of application Ser. No. 08/396,432, filed Feb. 28, 1995 now U.S. Pat. No. 5,634,852.

BACKGROUND OF THE INVENTION

The present invention relates to a uniform speed joint and an axial piston pump using the joint and, more particularly, to a uniform speed joint suitable for connecting a driving member and a driven member at highly precise uniform speed and an axial piston pump using the joint.

Universal joints in each of which a driving member and a driven member are connected through drive pins, the ends of which are fixed to the driving member and the other ends of the drive pins are slidably inserted in spherical bearings the circumference of which are engaged with the driven member, have been described in JP A 63-308220 or, JP B 4-72072, for instance.

Further, describes an improved arrangement in which drive pins are slidably inserted in a driving member, spherical head portions each are made in one piece with the drive pins, and a universal joint is constructed by engaging them with a driven member.

The known universal joint is constructed so that a difference in the pitch circle of drive pins changing position according to their change in inclination angle between the driving member and the driven member is compensated. However, since the driving member and driven member are connected by a pair of the drive pins, speed change takes place twice per one revolution. Therefore, the speed becomes nearly uniform, but it has deficiency that the rotation can not be transmitted at precisely uniform speed. Accordingly, problems such as mechanical vibrations or rotation noises are not solved.

In the known universal joint, since the bending stress necessary to transmit rotation is applied to the drive pins, slide resistance is large and, in particular, becomes a rotation load at high speed rotation whereby uniform rotation is not achieved. Therefore, in this case, also, even if rotation becomes uniform, problems such as mechanical vibrations and rotation noises are not solved.

SUMMARY OF THE INVENTION

An object of the present invention is to provide a uniform speed joint of simple construction which has excellent uniformity in speed with less mechanical vibrations or noises.

Another object of the present invention is to provide an axial piston pump using a uniform speed joint which has high reliability can be made simply and easily.

One object of the present invention resides in providing a uniform speed joint having at least three drive pins arranged between a driving member and driven member to mechanically connect the driving member and the driven member. The drive pins have ends which are concentrically arranged and fixed in one side face of one of the driving member and the driven member; the other ends of said drive pins are rotatably and slidably arranged and supported in the other member through ball bearings, the periphery of each of which is restricted and supported.

Another object of the present invention resides in an axial piston pump comprising a cylinder barrel accommodated in a housing and rotating together with a drive shaft, an inclined disc fixedly arranged in an inner surface of the housing and receiving axial force, and a piston device arranged between the inclined disc and the cylinder barrel for transmitting rotational force of the cylinder barrel to the inclined disc. The cylinder barrel is concentrically arranged with respect to the drive shaft, and three or more drive pins are arranged equidistantally at positions closer to the drive shaft than an axis of the piston device; the other end of each drive pin is arranged rotatably and slidably in the inclined disc, and supportedly passes through the inclined disc through a ball bearing the periphery of which is restricted and supported.

A driving member and a driven member are connected through a plurality of pins, axes of respective members cross at an angle α (160°) at a central point of a guide pin and rotate. A straight line connecting the centers of bearings disposed at symmetrical position is positioned on a plane dividing equiangularly the cross angle α, into two, and the bearings are self-aligned along the plane dividing line.

Combined with the uniform speed construction, another end of each drive pin slidably moves the bearing and transmits rotation to the driven member as the drive shaft rotates.

Combined with the uniform speed construction, another end of each drive pin slidably moves the bearing and transmits rotation to the driven member as the drive shaft rotates.

Therefore, even if bending stress necessary to transmit rotation is applied on the drive pins, the ball bearings can smoothly move axially.

DETAILED DESCRIPTION OF EMBODIMENTS OF THE INVENTION

Figure 1:
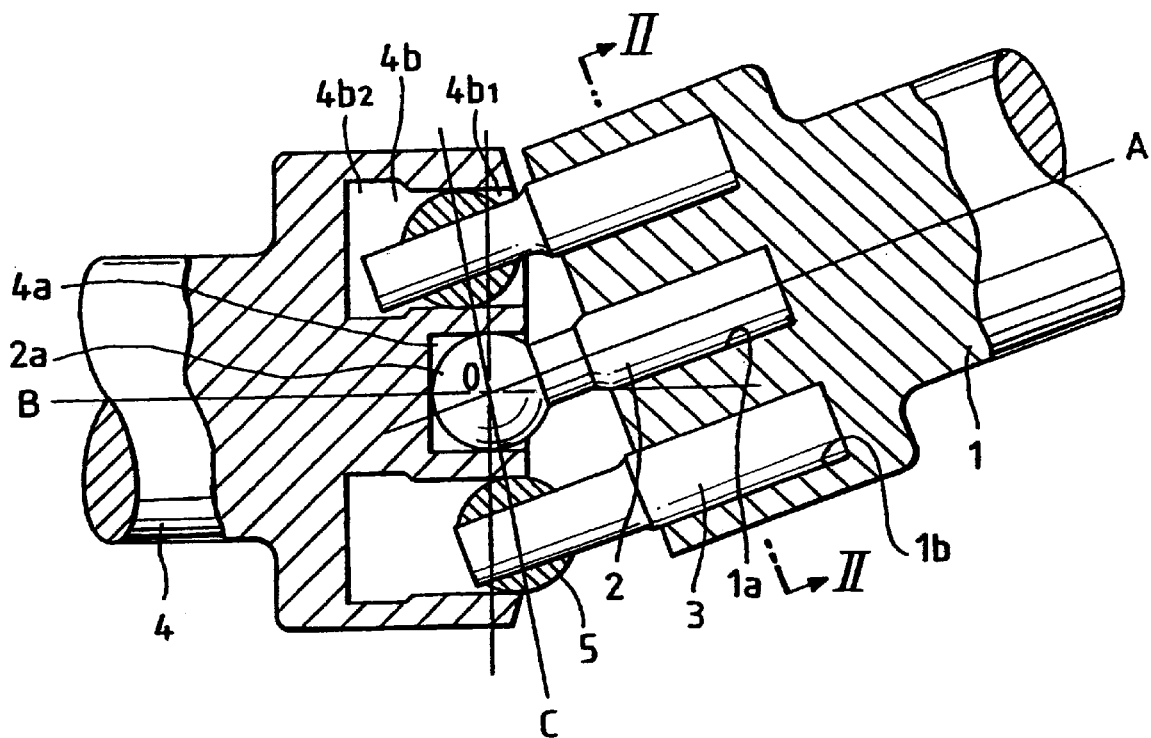
FIG. 1 is a partial sectional front view of a uniform speed joint of an embodiment of the present invention.
Figure 2:
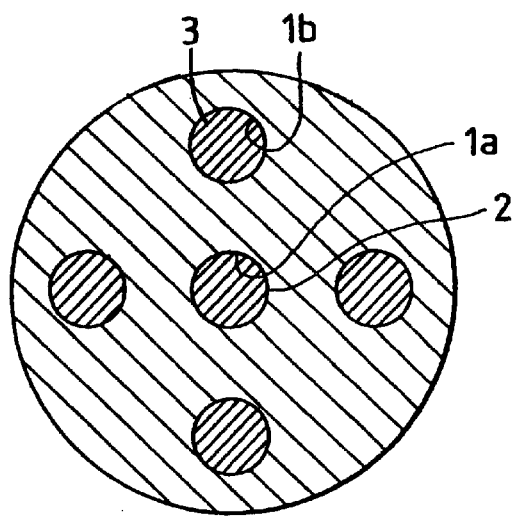
FIG. 2 is a sectional view taken along a line II—II in FIG. 1.
Figure 3:
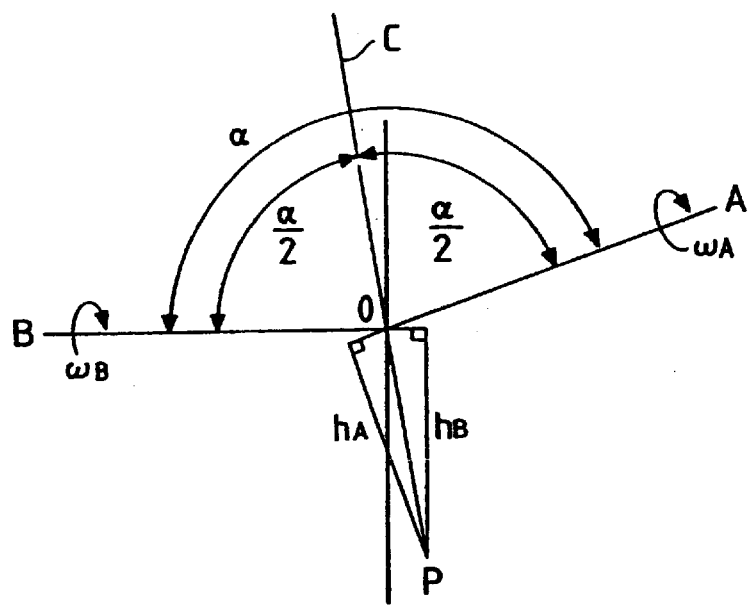
FIG. 3 is a diagram showing a geometrical relation of the uniform speed joint in FIG. 1.

An embodiment of the present invention is described hereunder referring to FIGS. 1 to 3.

A driving member 1 (driving shaft) connected to a driving source such as a separately arranged motor, etc. is formed in shape by cold forging formation or machining, and a mounting hole 1a for a guide pin 2 which extends in parallel to an axis of the driving member 1 is formed in a central portion of one side face thereof. Further, four mounting holes 1b for drive pins 3 which extend in parallel with the mounting hole 1a are formed concentrically with the mounting hole 1a and at equidistance as shown in FIG. 2, the drive pins each being fixed thereto by press-fit. However, any fixing such as welding, plastic deformation joining, etc. can be applied as long as it can fix the drive pins with sufficient strength. A driven member (driven shaft) 4 arranged opposite the driving member 1 at any inclination angle is formed in the same manner as mentioned above, a hole 4a for arranging the guide pin 2 and holes 4b for arranging the drive pins 3 are formed in a face opposite to the mounting holes 1a, 1b. The guide pin arranging hole 4a is concave and sized so that a ball head 2a can move freely therein. Further, as the receiving face shape, hemi-spherical shape can be used therefor. On the other hand, the driving pin arranging holes 4b are insertion holes 4b1 for the bearings 5 which are described hereunder in detail and drive pin escaping holes 4b2 which are formed to communicate with the holes 4b1 and the diameter of each of which is larger than a diameter of each of the holes 4b1.

The above-mentioned bearings 5 each are a hard ball made of tool steel, etc. and slidably mounted on a tip portion of the drive pin 3.

Here, the driving member 1 and the driven member 4 are connected through a plurality of the pins 3, the respective axes A and B cross at a central point 0 of the guide pin 2 at an angle α (160°), a straight line C connecting the centers of the bearings disposed symmetrically is positioned on a plane dividing equiangularly the cross angle a into two, and the bearings 5 are self-aligned on the line and held thereon.

In FIG. 3, considering geometrical relations of the axes A, B, C, a point P is a center of the bearing 5, which point is a power transmitting point. Here, assuming that distances of the point P from the axes A, B are $h_A$ and $h_B$, respectively, a straight line C connecting the point P and the point 0 divides equiangularly the cross angle a into two angles, so that $h_A=h_B$. Further, assuming that angular velocities of the axis A of the driving member 1 and the axis B of the driven member 4 are $\omega_A$, $\omega_B$, respectively, peripheral velocities of both axes around the point P are $\omega_A$, x $h_A$ $\omega_B$, x $h_B$, respectively. Here, since the point P is unchangeable in its position, these peripheral velocities are equal to each other, that is, $\omega_A$,x $h_A$ $\omega_B$, x $h_B$. Accordingly, $\omega_A=\omega_B$, so that the power transmitting point P is always positioned on a plane dividing equiangularly the cross angle a into two, whereby uniform speed rotation transmission between the driving member 1 and the driven member 4 can be affected.

In the above-mentioned embodiment, the guide pin 2 is provided between the driving member 1 and the driven member 4, however, if the joint is constructed so that distance between the driving member 1 and the driven member 4 is properly kept to a predetermined distance, the guide pin 2 can be omitted, that is, in such a case, the guide pin 2 is unnecessary. It is better to protect the joint portion from dusts by providing a cover, if necessary.

According to the embodiment of the present invention, combined with the construction of uniform speed, since the drive pins are fixed to either one of the driving member and the driven member, and the ball bearings are slidably arranged on the other ends of the drive pins and connected to the other member through the ball bearings, the drive pins slide the ball bearings according to rotational position of the drive shaft. Accordingly, even if bending stress necessary to transmit the rotation is applied to the drive pins, the ball bearings can move axially smoothly, and particularly, a smooth transmission of rotation to a driven member can be attained at high speed rotation. Such a problem as mechanical vibrations, rotation noises can be solved, and a practical uniform speed joint can be provided with a simple construction.

Figure 4:
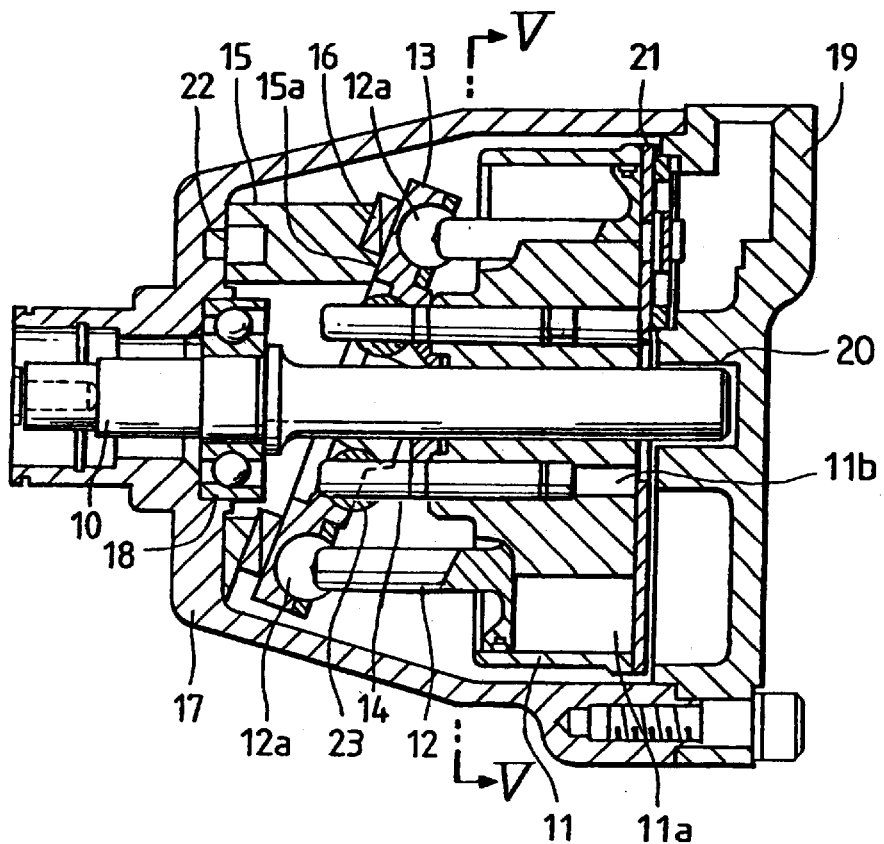
FIG. 4 is a sectional view of an axial piston pump using the uniform speed joint of the present invention.
Figure 5:
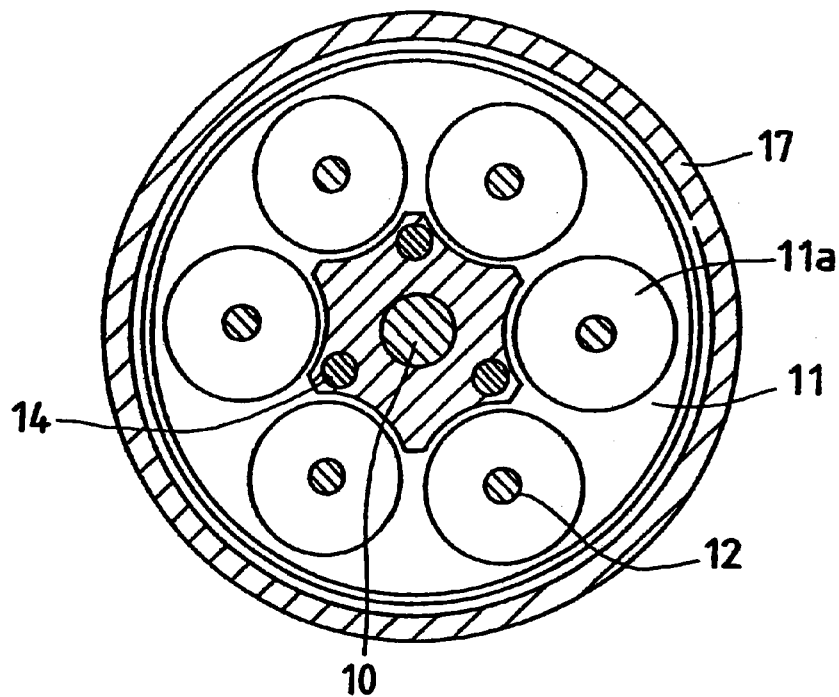
FIG. 5 is a sectional view of FIG. 4.
Figure 6:
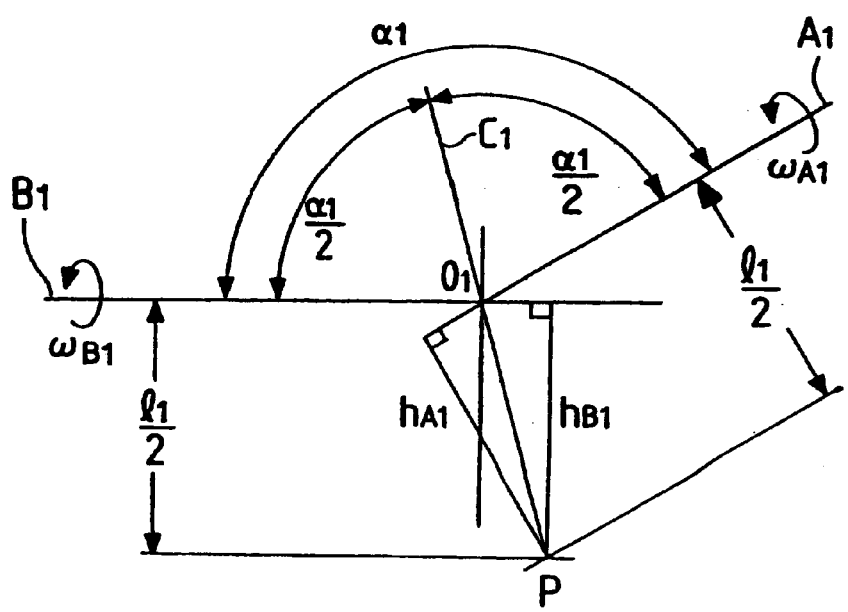
FIG. 6 is a diagram showing a geometrical relation of a joint mechanism in FIG. 4.

Next, an axial piston pump apparatus of application of the above-mentioned uniform speed joint is explained, referring to FIGS. 4 to 6.

In Figures, the piston pump apparatus comprises a drive shaft 10, a cylinder barrel 11 rotating together with the drive shaft 10, pistons 12 reciprocating in cylinder bores 11a formed in the cylinder barrel 11, a piston support 13 rotating together with the pistons 12 and converting the rotational motion into reciprocating motion of the pistons 12, drive pins 14 transmitting the rotation of the cylinder barrel 11 to the piston support 13, and a fixed swash plate 15 supporting, through a thrust bearing 16, the piston support 13 positioned at an inclination angle a to the drive shaft 10.

One end of the driving shaft 10 is supported to a housing 17 through a roller bearing 18. Further, the other end of the driving shaft 10 is supported to a side cover 19 through a bearing 20, and the cylinder barrel 11 is axially fixedly arranged through a valve plate 21.

A plurality of the pistons 12 are inserted in the cylinder bores 11a, and the head ball portions 12a of the pistons 12 are connected and held to the piston support 13 which is supported by a central portion of the driving shaft 10.

The fixed swash plate 15 is a cylindrical body positioned on the back of the piston support 13, and an outer end portion 15a of the plate is annular and inclined at the inclination angle a to the drive shaft 10, and fixed by pins or others (not shown) after its position is positioned by using positioning pins 22.

The drive pins 14 are arranged concentrically at an inner side of the pistons 12. An end of each drive pin 14 is pressed in and fixed to a drive pin insertion hole 11b formed in the cylinder barrel 11, and the other end thereof is rotatably inserted in a ball receiving hole formed in an end face of the piston support 13 through a ball bearing 23.

The piston pump apparatus has an above-mentioned construction, which sectional view taken along a line V—V is shown in FIG. 5. As shown in the figure, the drive pins 14 at an inner side and the pistons 12 at an outer side are concentrically arranged around the drive shaft 10.

In the piston pump apparatus, as the drive shaft 10 rotates, the cylinder barrel 11 rotates, and the rotational force is transmitted through the drive pins 14 to drive rotation of the piston support 13. Accordingly, the pistons 12 are reciprocated by the rotation to generate discharge pressure.

Uniformity in speed of the swash type pump apparatus is explained, referring to FIG. 4 and FIG. 6. In FIG. 6, assuming that an axis of the drive shaft 10 is a drive axis $A_1$, and an axis of the cylinder support 13 is a driven axis $B_1$, the drive axis $A_1$ and the driven axis $B_1$ cross at a cross angle $\alpha_1$. Since an inclination angle of the annular portion 15a of the fixed swash plate 15 opposing the piston support 13 is $\alpha_1/2$, inclination angle of a plane $C_1$, to the drive axis $A_1$, which plane includes therein a straight line connecting the centers of the ball bearings 23 of two of the drive pins 14, becomes $\alpha_1/2$. That is, as in the previous embodiment, a power transmitting point is always on the plane dividing equally the cross angle $\alpha_1$, between the drive axis $A_1$ and the driven axis $B_1$ into two, conditions of uniformity in speed is satisfied. Therefore, rotation of the drive axis $A_1$ is transmitted to the driven axis $B_1$ at uniform speed, whereby transmission of rotation between the drive shaft 10 and the pistons; 12 is effected at uniform speed. Further, since the inclination angle $\alpha_1/2$ is fixed at the fixed swash plate 15, uniform speed transmission is surely achieved. That is, synchronous rotation can be achieved without applying any outer force to the piston portions which influences performance of the pump. Further, as for the fixed swash plate 15, any member can be selected from prepared several members having different inclination angles according to a discharge amount, if a relation between the annular portion 15a and the plane $C_1$, including a straight line connecting the centers of the ball bearings 23 satisfies the previously mentioned relation of $\alpha_1$ and $\alpha_1/2$.

According to the embodiment of the present invention, combined with the construction of uniform speed, since the drive pins are fixed to one side of the cylinder barrel, and the ball bearings are slidably arranged on the other ends of the drive pins and connected to the piston support through the ball bearings, the drive pins slide the ball bearings according to rotational position of the cylinder barrel. Accordingly, even if bending stress necessary to transmit the rotation, the ball bearings can move axially smoothly, and particularly, a smooth transmission of rotation can be attained at high speed. The axial piston pump using a uniform speed joint which is less in mechanical vibrations, and rotation noises can be provided.

According to the present invention, a uniform speed joint which is excellent in uniformity of speed, and less in mechanical vibrations and noises can be provided.

Further, according to the present invention, an axial piston pump which is high reliable and uses a uniform speed joint can be provided easily.

What is claimed is:

1. An axial piston pump comprising a cylinder barrel accommodated in a housing and rotating together with a drive shaft, a member having an inclined surface fixedly arranged in an inner surface of said housing, a piston support arranged at the inclined surface so as to receive axial force, and a piston device arranged between said piston support and said cylinder barrel for transmitting rotational force of said cylinder barrel to said piston support, wherein said cylinder barrel is concentric with said drive shaft, and at least three drive pins are arranged equidistantally to said drive shaft and are axially fixed in said cylinder barrel; and one end of each said drive pin is arranged rotatably and slidably in said piston support, and supportedly passes through said piston support through a ball bearing in a hole formed in said piston support, the periphery of said ball bearing being restricted and supported by a wall defining said hole without radial movement in said hole.

2. An axial piston pump comprising a drive shaft, a cylinder barrel rotatable with the drive shaft and comprising at least one cylinder bore, a piston support disk rotatably arranged at a fixed inclination angle relative to the drive shaft, at least one piston the one end of which is slidable in a corresponding cylinder bore and the other end of which is in engagement with the piston support disk, and a mechanism for transmitting a rotational force between the cylindrical barrel and the piston support disk, which mechanism comprises at least three drive pins arranged around and in parallel to said drive shaft and axially fixed in the cylinder barrel, one end of each said drive pin being arranged in the barrel and the other end engaged with the piston support disk via a ball, said pins being rotatably and axially slidably arranged in respective holes each extending in parallel to the rotating axis of the piston support disk, wherein the drive pins are fixedly arranged in the barrel, and the balls are rotatably and axially slidably provided on the ends of the drive pins protruding in the direction of the piston support disk, said balls each being restrained by a wall portion of said hole without radial movement in said hole.

3. The axial piston pump according to claim 2, wherein the drive shaft is rotatably journalled in a housing and in that on the housing a guiding element having an inclined surface is fixed, on which one side of the piston support disk is guided.

* * * * *